(12) United States Patent
Holzweissig et al.

(10) Patent No.: US 11,548,357 B2
(45) Date of Patent: Jan. 10, 2023

(54) VEHICLE DOOR OF ARMOR STEEL

(71) Applicant: Benteler Automobiltechnik GmbH, Paderborn (DE)

(72) Inventors: Martin Holzweissig, Paderborn (DE); Udo Klasfauseweh, Gütersloh (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 17/672,366

(22) Filed: Feb. 15, 2022

(65) Prior Publication Data

US 2022/0332174 A1 Oct. 20, 2022

(30) Foreign Application Priority Data

Feb. 19, 2021 (DE) .................. 10 2021 103 999.1

(51) Int. Cl.
*B60J 5/04* (2006.01)
*F41H 7/04* (2006.01)

(52) U.S. Cl.
CPC ............. *B60J 5/0408* (2013.01); *B60J 5/048* (2013.01); *F41H 7/04* (2013.01)

(58) Field of Classification Search
CPC ........... B60J 5/0408; B60J 5/048; F41H 7/04
USPC .......................................................... 49/155
See application file for complete search history.

(56) References Cited

U.S. PATENT DOCUMENTS

| | | | | |
|---|---|---|---|---|
| 11,000,890 | B2* | 5/2021 | Otsuka | B21D 22/22 |
| 2005/0264028 | A1* | 12/2005 | Bodin | B60J 5/0425 |
| | | | | 296/146.6 |
| 2006/0213361 | A1* | 9/2006 | Muller | F41H 5/02 |
| | | | | 89/929 |
| 2006/0290166 | A1* | 12/2006 | Gehringhoff | B60J 5/0429 |
| | | | | 296/146.6 |
| 2007/0119102 | A1* | 5/2007 | Seibert | B60J 5/0416 |
| | | | | 49/502 |
| 2009/0205394 | A1* | 8/2009 | Luckey, Jr. | B21D 26/055 |
| | | | | 72/352 |
| 2011/0283874 | A1* | 11/2011 | Klasfauseweh | F41H 7/04 |
| | | | | 89/36.02 |
| 2012/0312152 | A1 | 12/2012 | Klasfauseweh et al. | |

(Continued)

FOREIGN PATENT DOCUMENTS

| | | |
|---|---|---|
| DE | 102008010168 | 8/2009 |
| DE | 102010009183 | 8/2011 |

(Continued)

*Primary Examiner* — Hilary L Gutman
(74) *Attorney, Agent, or Firm* — Henry M. Feiereisen LLC

(57) ABSTRACT

A vehicle door includes a window frame and a lower surface portion formed jointly with the window frame in one piece from a hot formed and press hardened sheet metal plate which is made of a steel alloy which includes, in weight-%: Carbon 0.33-0.38, Silicon 0.2-0.7, Manganese 0.7-1.2, Phosphorus max. 0.03, Sulfur max. 0.02, Boron 0.002-0.005, Chromium 0.6-1.0, Copper max. 0.12, Nitrogen max. 0.005, Titanium 0.015-0.025, Nickel 1.5-2.0, Molybdenum 0.2-0.6, Tin max. 0.04, and as optional components Aluminum 0.006-0.08, Niobium 0.02-0.05, with a balance being iron and incidental impurities. At least the lower surface portion has a Brinell hardness of 500 to 600 HB and a yield strength of 1,200 to 1,450 MPa, wherein the lower surface portion and/or the window frame has a wall thickness of at least 6 mm.

20 Claims, 4 Drawing Sheets

(56) References Cited

U.S. PATENT DOCUMENTS

| | | | | |
|---|---|---|---|---|
| 2015/0174993 A1* | 6/2015 | Yi | ............................ | B60J 10/75 296/146.2 |
| 2017/0299344 A1 | 10/2017 | Borchert et al. | | |
| 2020/0393218 A1 | 12/2020 | Borchert et al. | | |

FOREIGN PATENT DOCUMENTS

| | | | | |
|---|---|---|---|---|
| DE | 102013108163 A1 * | 2/2015 | ............. | C21D 6/005 |
| DE | 102015116879 | 4/2017 | | |
| DE | 102016113542 | 8/2017 | | |
| DE | 102017126660 | 5/2019 | | |
| DE | 102019116363 | 12/2020 | | |
| WO | WO-2017164079 A1 * | 9/2017 | ............. | B21D 22/20 |

* cited by examiner

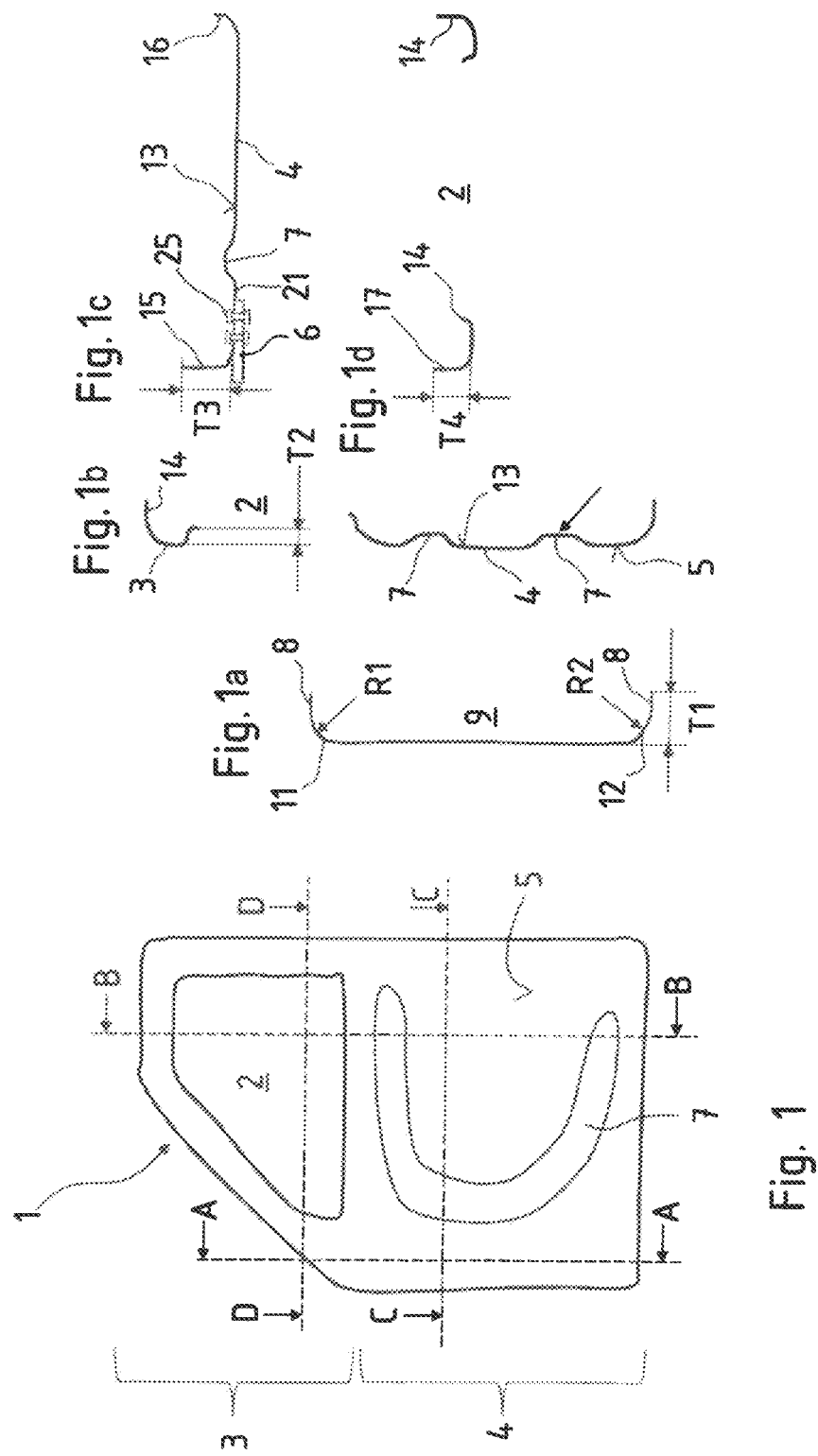

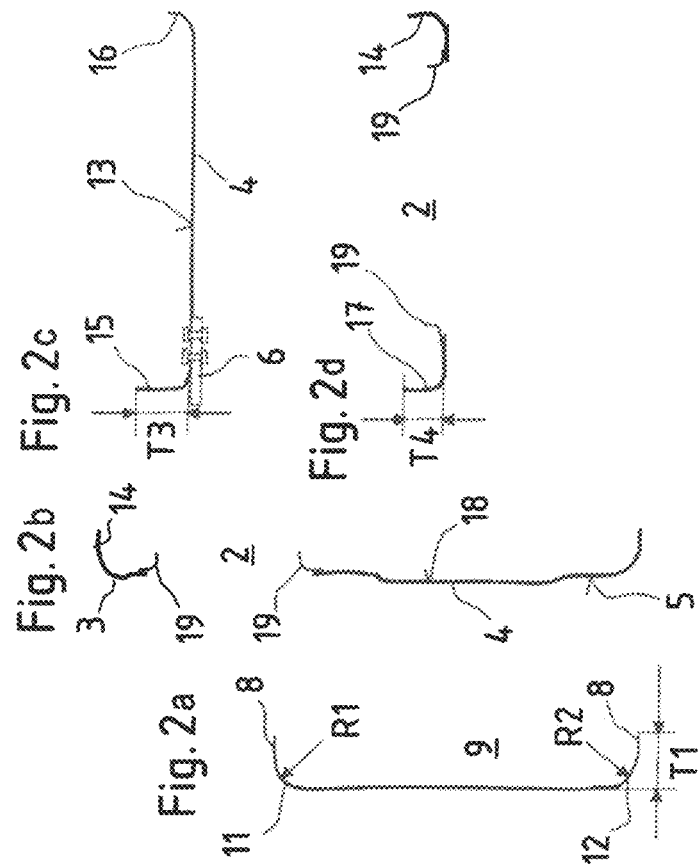
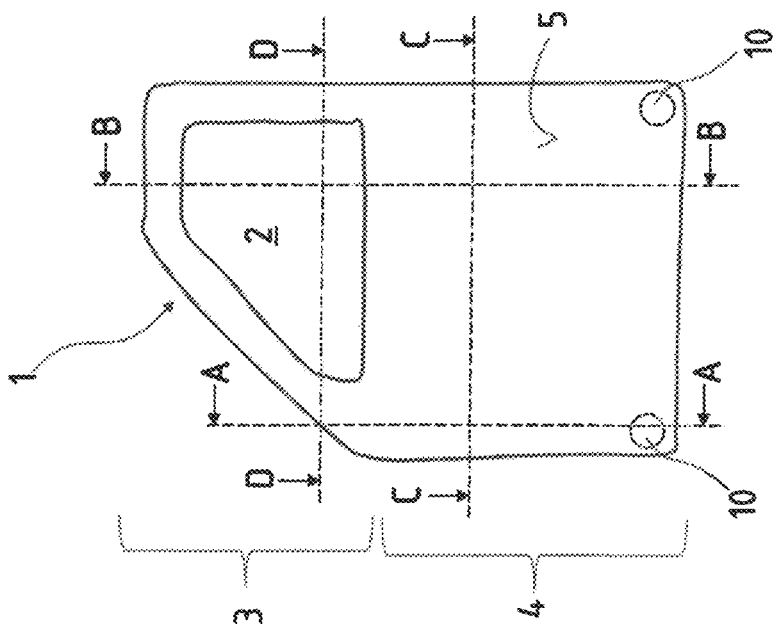

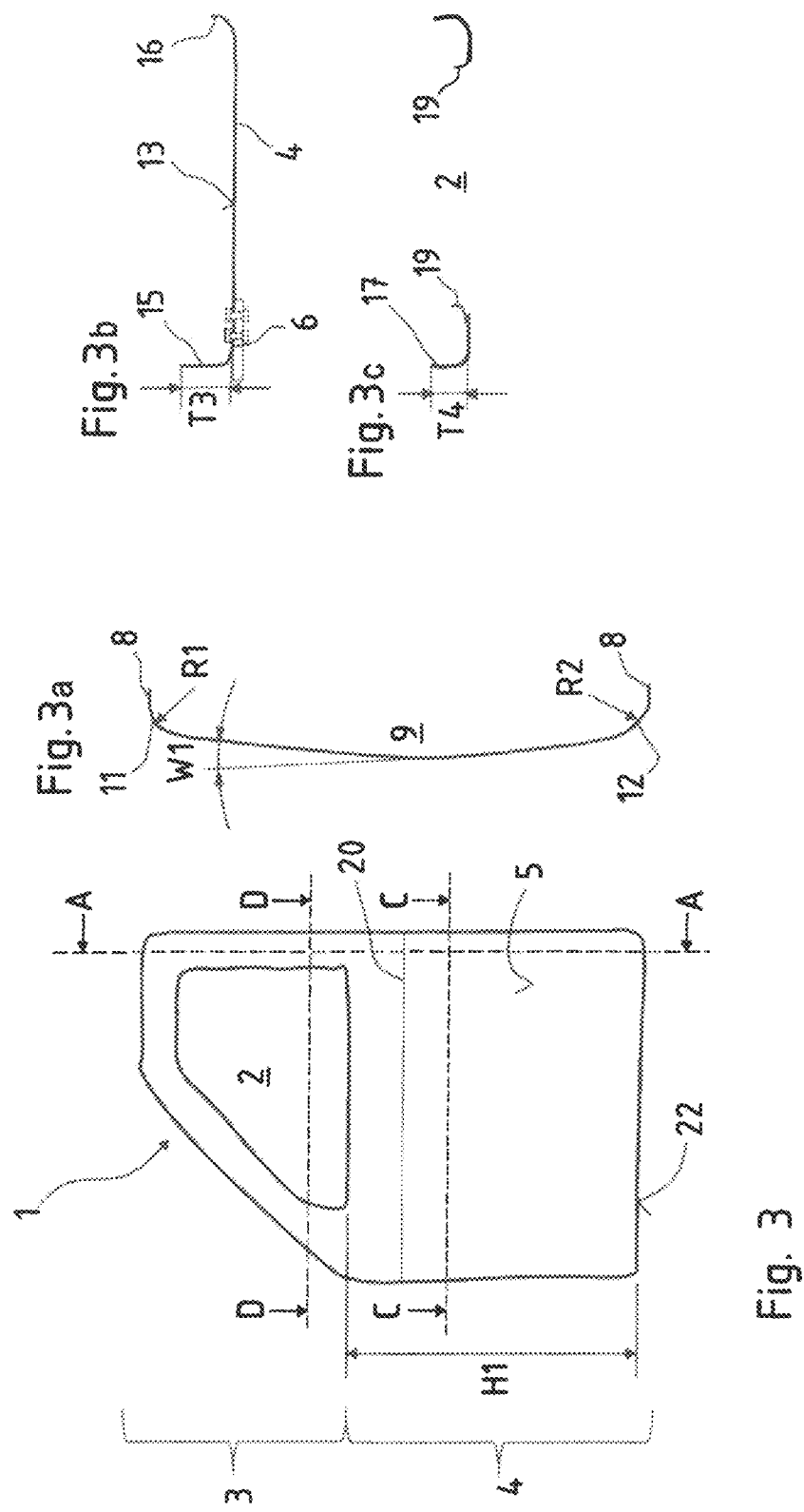

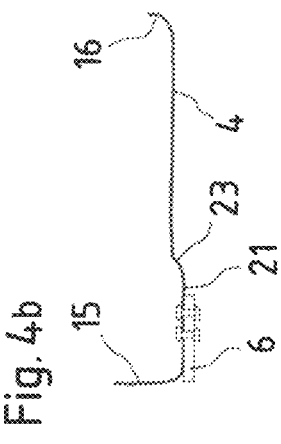
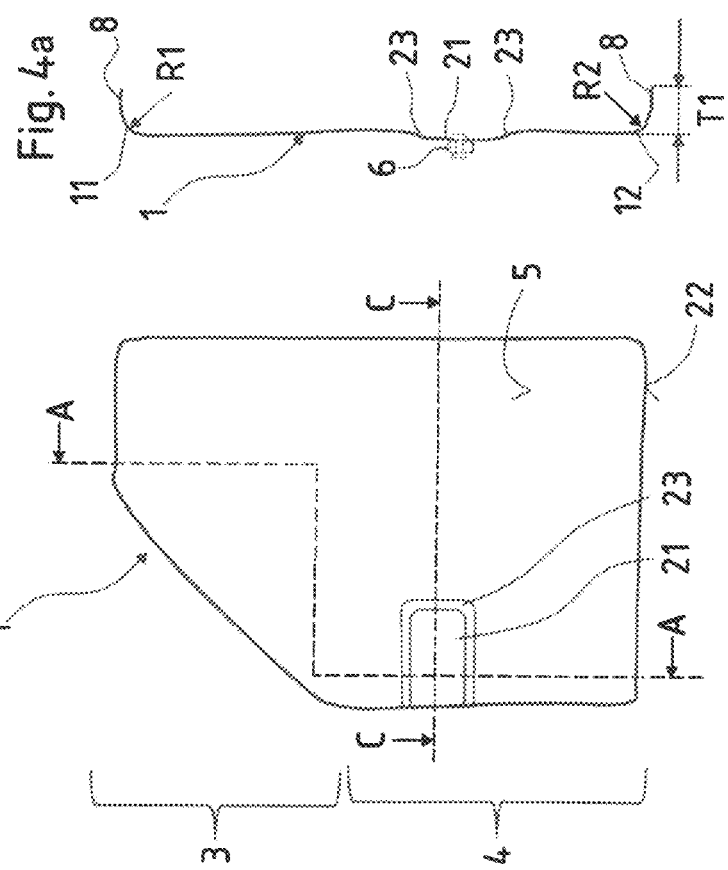

VEHICLE DOOR OF ARMOR STEEL

CROSS-REFERENCES TO RELATED APPLICATIONS

This application claims the priority of German Patent Application, Serial No. 10 2021 103 999.1, filed Feb. 19, 2021 pursuant to 35 U.S.C. 119(a)-(d), the disclosure of which is incorporated herein by reference in Its entirety as if fully set forth herein.

BACKGROUND OF THE INVENTION

The invention relates to a vehicle door.

The following discussion of related art is provided to assist the reader in understanding the advantages of the invention, and is not to be construed as an admission that this related art is prior art to this invention.

Armor steels for ballistic protection typically have a hardness of 600 HB at tensile strengths of around 2,000 MPa. A challenge when using armor steel is to create complex shapes in order to enable a cost-effective production of a component of complex shape, such as, e.g. a vehicle door. Low-alloy special steels, which are on the market as hardened flat plates, cannot be used for the production of components of complex shape due to their high hardness and the resulting low malleability. Armor steels with a hardness in the range of 550 HB are designed for hardening in a water quenching unit and are therefore unsuitable for hardening in a hot forming process. Welded components can have weak points due to the influence of heat during welding.

It would therefore be desirable and advantageous to provide an improved vehicle door of armor steel to obviate prior art shortcomings.

SUMMARY OF THE INVENTION

According to one aspect of the invention, a vehicle door includes a window frame, a lower surface portion formed jointly with the window frame in one piece from a hot formed and press hardened sheet metal plate, at least the lower surface portion having a Brinell hardness of 500 to 600 HB and a yield strength of 1,200 to 1,450 MPa, wherein at least one of the lower surface portion and the window frame has a wall thickness of at least 6 mm, a curved zone defined by a radius of curvature sized to be 1 to 3 times the wall thickness, and a connection zone for a door hinge, wherein the sheet metal plate is made of a steel alloy which comprises, in weight-%:

| | |
|---|---|
| Carban | 0.33-0.38 |
| Silicon | 0.2-0.7 |
| Manganese | 0.7-1.2 |
| Phosphorus | max. 0.03 |
| Sulfur | max. 0.02 |
| Boron | 0.002-0.005 |
| Chromium | 0.6-1.0 |
| Copper | max. 0.12 |
| Nitrogen | max. 0.005 |
| Titanium | 0.015-0.025 |
| Nickel | 1.5-2.0 |
| Molybdenum | 0.2-0.5 |
| Tin | max. 0.04, | with a balance being iron and incidental impurities.

A vehicle according to the invention is made of armor steel which has no weak zones due to weld seams and has a completely martensitic microstructure with a hardness of at least 550 HB and which can be produced by a hot forming process.

According to another advantageous feature of the invention, the steel alloy may further include, in weight-%, 0.006-0.06 of aluminum and 0.02-0.05 of niobium.

According to another advantageous feature of the invention, the window frame may be configured to surround an opening in adjoining relation to the lower surface portion. Of course, depending on the intended use, the vehicle door may be produced without an opening. The term "window frame" only relates to the respective frame area. In the absence of an opening, the term "window frame" also includes the upper area or upper surface portion of the vehicle door which is filled with the armor steel and is surrounded by the frame. Unless otherwise stated, the term "window frame" is to be understood in the following description as relating to a frame with or without opening.

The window frame and the lower surface portion are formed in one piece from a single, hot formed and press hardened sheet metal blank of armor steel. The lower surface portion and/or the window frame of the vehicle door has a Brinell hardness of 500-600 HB and a yield point of 1,200-1,450 MPa. The wall thickness of the lower surface portion and/or window frame is at least 6 mm. The hot formed and press hardened vehicle door can have a plurality of curved zones that have radii of curvature in a range from 1 to 3 times the wall thickness of the vehicle door. Thus, comparatively narrow radii of curvature are involved to make it possible to produce a collared edge through crash molding or deep drawing. The collared edge may advantageously be angled at least 50°, in particular at least 70°, in relation to the inside of the vehicle door in order to protect the door gap against bullet penetration when the vehicle door is closed. Currently preferred is an angling of the collared edge by about 90°.

The vehicle door can have a connection zone in order for the vehicle door to be connected to the motor vehicle via a door hinge. Advantageously, the connection zone can be located outside the door gap. Currently preferred is the arrangement of the connection zone in the lower surface portion. As a result, the door gap can be very narrow, so that better ballistic protection is made possible in the area of the door gap.

Advantageously, the sheet metal plate used to manufacture the vehicle door involves a steel alloy from the group of manganese-boron steels. The composition of the steel alloy combines the advantages of armor steel with the manufacturing-related advantages of hot forming combined with press hardening, so that the hardened workpiece is true to size. The composition of the steel alloy enables a completely martensitic microstructure that can be achieved through hot forming and press hardening. The need for welded connections is eliminated when a vehicle door with bent and circumferential collared edge is involved. There is thus no need to weld the collared edge. The armor steel is therefore not thermally weakened and the vehicle door has better ballistic properties in the border region compared to welded constructions.

The sheet metal blank can be manufactured from a slab that has been slowly cooled in the steel mill, heated in a pusher-type furnace and heated to a drawing temperature of 1200° C. +20/−50° C. Rolling takes place at sheet thicknesses of 6.3 mm to less than 8 mm up to a final temperature of 880° C. +20/−50° C., in a range from 8.0 mm to less than 10 mm at a final rolling temperature of 860° C. +20/−50° C., and for sheet thicknesses between 10 mm and <14 mm at a final rolling temperature of 840° C. +20° C./−50° C. This is followed by hot straightening without heat treatment while maintaining the relevant surface standards and normal planes. The sheet metal blanks produced in this way are free of welded seams and free of flaws that limit their usability as armor steel. The hydrogen content is maximal 4 ppm.

The use of a steel alloy according to the invention for the production of a vehicle door enables a forming of sheet metal blanks into the finished component without any weakened areas due to welded joints and resultant heat-impact zones. Such a one-piece vehicle door can be hot formed despite a considerable wall thickness and, due to the hot forming and subsequent press hardening processes, can adhere to tight predetermined tolerances, so that the vehicle door can be used, without need for aftertreatment that could weaken ballistic properties, not only as armor but directly as a vehicle door for ballistic protection of a vehicle.

The vehicle door can be connected to the vehicle via a door hinge. The door hinge can be mechanically fastened, e.g. screwed to the vehicle door. Mechanical fastening is superior to a welded connection because of the absence of any thermally induced weakening of the material.

The vehicle door can be formed with relatively narrow radii of curvature to enable realization of a circumferential collared edge, which is crucial for ballistic protection in the circumferential door gap. The slender window frame is stiffened by the circumferential collared edge and, moreover, the collared edge can completely encompass a pane arranged in the opening on the border side. The collared edge can have, for example, a depth of 10 to 50 mm, advantageously 20-50 mm. This protects the transition zone between the vehicle door and the adjacent body areas against entry of projectiles.

A vehicle door according to the invention can be contoured and shaped as required and can also be provided with stiffening beads. The steel alloy can have a yield point in a range of 700-950 MPa with an elongation of at least 13%.

The selected carbon content of the steel alloy can be used to achieve a desired hardness during transformation of the structure from austenite to martensite during press hardening. Manganese increases strength and hardenability. The low levels of impurities, e.g. phosphorus and sulfur, result in higher purity of the grain boundaries. Molybdenum has a positive effect on the strength of the material. Chromium has a positive influence on hardenability. Nickel increases toughness and also improves hardenability. Boron has a positive effect on hardenability.

A vehicle door according to the invention can have regions with a forming degree in a range from 5 to 20%. These regions can be located in the area of the window frame, which advantageously has a peripheral collared edge. Such a collared edge can continue into the surface portion of the vehicle door adjoining the window frame at the bottom. The collared edge can have a depth through formation in a range of 10-75 mm and advantageously in the range of 20-50 mm. A high forming degree can be realized in the lower corner zone of the lower surface portion. The collared edge can hereby follow the edge contour of the vehicle door, which is bent by 90°, for example.

According to another advantageous feature of the invention, a content of carbon in the steel alloy can be 0.34 to 0.37 in weight-%. Advantageously, the steel alloy can have a carbon equivalent Ceq in a range from 0.7 to 0.95 in weight-%. The carbon equivalent Ceq is calculated according to the following equation: $Ceq=C+Mn/6+(Cu+Ni)/15+(CR+Mo+V)/5$. The hot formed and press hardened component, i.e. the vehicle door, has advantageously a fully martensitic microstructure, i.e. it is completely through-hardened.

According to another advantageous feature of the invention, a content of manganese in the steel alloy can be 0.8 to 1.0 in weight-%. A content of chromium in the steel alloy can be 0.7 to 0.9 in weight-%. A content of nickel in the steel alloy can be 1.6 to 1.8 in weight-%. A content of molybdenum in the steel alloy can be 0.3 to 0.4 in weight-%. A content of aluminum in the steel alloy can be 0.01 to 0.05 in weight-%, and a content of niobium in the steel alloy can be 0.03 to 0.04 in weight-%.

According to another advantageous feature of the invention, the wall thickness of the lower surface portion and/or the window frame can be in a range from 8 to 11 mm, depending on the bullet-resistance class that such a vehicle door should withstand and also depending on whether a vehicle is to be protected against soft-core projectiles or hard-core ammunition. When soft-core projectiles are involved, the wall thickness can be reduced. The selection of the wall thickness depends on the fact that the steel being used has sufficient ductility for the required energy consumption and, at the same time, high hardness. In addition, the wall thickness of the vehicle door should generally be as small as possible for weight reasons.

Press hardening enables relatively narrow angular tolerances to be maintained. An angled area can be formed in a transition between the window frame and the lower surface portion. The angle between the window frame and the lower surface portion is advantageously 1° to 15°. Currently preferred is an angle of 2° to 10°. When installed, the vehicle door may virtually be placed slightly outwards in midsection or, when the lower surface portion assumes a vertical position, the upper end of the window frame is inclined slightly towards the middle of the vehicle. Press hardening can achieve a high manufacturing accuracy so that the outer side of the vehicle door, when produced in this way from the sheet metal blank, may also serve directly as a painted visible side.

According to another advantageous feature of the invention, a crease line can extend between 50% and 80% of a height of the lower surface portion, with the height of the lower surface portion measured from a lower edge of the vehicle door, when installed; wherein the vehicle door can be angled along the crease line by 1° to 15°. The crease line can therefore be at a distance of 20% to 50% of the height from the window frame and at a corresponding distance from the opening in the window frame.

Necessary operating elements, such as a door handle or also door hinges, can be mechanically attached to the outer side in order to avoid any weakened areas due to heat impact. When the wall thickness is small, at least one reinforcing bead may additionally be arranged in the lower surface portion. Several reinforcing beads or crossing reinforcing beads (X-shape) can be formed in the vehicle door. The at least one reinforcing bead can extend across the crease line on both sides of the crease line.

To increase variability for certain applications, provision may be made for a reinforcing collar to be welded to the window frame and/or to the surface portion which adjoins the window frame, with the reinforcing collar oriented towards the opening in the vehicle door. The reinforcing collar may be necessary in order to match different panes or window openings. Such a reinforcing collar is, however, only used, when a certain region cannot be produced by forming through deep drawing and press hardening.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic illustration of a first embodiment of a vehicle door according to the invention;

FIG. 1a is a sectional view of the vehicle door of FIG. 1, taken along the section line A-A;

FIG. 1b is a sectional view of the vehicle door of FIG. 1, taken along the section line B-B;

FIG. 1c is a sectional view of the vehicle door of FIG. 1, taken along the section line C-C;

FIG. 1d is a sectional view of the vehicle door of FIG. 1, taken along the section line D-D;

FIG. 2 is a schematic illustration of a second embodiment of a vehicle door according to the invention;

FIG. 2a is a sectional view of the vehicle door of FIG. 2, taken along the section line A-A;

FIG. 2b Is a sectional view of the vehicle door of FIG. 2, taken along the section line B-B;

FIG. 2c is a sectional view of the vehicle door of FIG. 2, taken along the section line C-C;

FIG. 2d is a sectional view of the vehicle door of FIG. 2, taken along the section line D-D;

FIG. 3 is a schematic illustration of a third embodiment of a vehicle door according to the invention;

FIG. 3a Is a sectional view of the vehicle door of FIG. 3, taken along the section line A-A;

FIG. 3b is a sectional view of the vehicle door of FIG. 3, taken along the section line C-C;

FIG. 3c is a sectional view of the vehicle door of FIG. 3, taken along the section line D-D;

FIG. 4 is a schematic illustration of a fourth embodiment of a vehicle door according to the invention;

FIG. 4a is a sectional view of the vehicle door of FIG. 4, taken along the section line A-A; and FIG. 4b is a sectional view of the vehicle door of FIG. 4, taken along the section line C-C.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a first embodiment of a vehicle door according to the invention, generally designated by reference numeral 1. The vehicle door 1 is made of a manganese-boron steel which, in addition to iron and incidental impurities, includes by way of example the following alloy percentages in weight-%:

| | |
|---|---|
| Carbon | 0.34-0.37 |
| Silicon | 0.35-0.45 |
| Manganese | 0.8-0.9 |
| Phosphorus | max. 0.015 |
| Sulfur | max. 0.0002 |
| Aluminum | 0.01-0.04 |
| Boron | 0.002-0.004 |
| Chromium | 0.7-0.85 |
| Copper | max. 0.12 |
| Nitrogen | max. 0.005 |
| Niobium | 0.03-0.04 |
| Nickel | 1.6-1.75 |
| Titanium | 0.015-0.025 |
| Molybdenum | 0.3-0.4 |
| Tin | max. 0.04. |

The steel alloy involves an armor steel with a nickel content of at least 1.5 in weight-% so as to ensure sufficient toughness in the event of a blast and bullet resistance. A molybdenum content of at least 0.2 in weight-% Is provided to produce a necessary strength and at the same time to produce hardenability for realizing a fine microstructure. Molybdenum also serves as a transformation retarder, so that the cooling curve shifts to the right in the time-temperature diagram, and thus more time is available for hardening. As a result, the steel overall has a fine martensitic structure. The steel has a Brinell hardness of 550 HB with a yield strength of 1,200-1,450 MPa.

The vehicle door 1 is made in one piece from a single sheet metal plate and has an opening 2 which is bounded by a window frame 3 and is delimited on its lower side by a surface portion 4. FIG. 1 shows the outer side 5 of the vehicle door 1 on the left. For example, a left-hand vehicle door 1 of a motor vehicle may be involved here and can be connected to the body of the motor vehicle via a schematically illustrated door hinge 6, as shown in FIG. 1c. As is also readily apparent from the side view of FIG. 1, an essentially U-shaped reinforcing bead 7 is arranged in the area of the surface portion 4 and is used to stiffen the vehicle door 1.

FIG. 1a is a sectional view of the vehicle door of FIG. 1, taken along the section line A-A, and shows that the vehicle door 1 has a collared edge 8 both in the area of the upper end of the sectional plane and in the area of the lower end of the sectional plane. The collared edges 8 can each be bent by at least 50°, or 70° or even 90°, as shown in FIG. 1a. As a result, a recess 9 is formed with a depth T1 in the vehicle door 1. The recess 9 is produced by hot forming. As the collared edge 8 is formed, curved zones 11, 12 are established with a radius of curvature R1, R2. The radii of curvature R1, R2 are 1 to 3 times a wall thickness. The wall thickness of such a component is at least 6 mm and is substantially constant over the entire area of the vehicle door 1. Deviations may arise in the area of the curved zones 11, 12 as a result of tension and compression forces during hot forming. The forming degree in these areas is 5-20%. The depth T1 is dimensioned advantageously in a range between 10 and 75 mm. Currently preferred is a depth T1 in a range between 20-50 mm.

FIG. 1b is a sectional view of the vehicle door 1 of FIG. 1, taken along the section line B-B through the window frame 3 and through the surface portion 4. The reinforcing bead 7 can be seen as an embossment directed towards the vehicle interior, i.e. away from the outer side 5 of the vehicle door 1. In addition, a collar 14 is formed adjacent to the opening 2 for the window or pane and is directed inwards, i.e. to an inner side 13 of the vehicle door 1. The collar 14 has a depth T2 and provides a contact surface for a pane, not shown in greater detail. As an alternative, the reinforcing bead 7 may also point outwards to an outer side of the vehicle, i.e. the reinforcing bead 7 may be directed away from the vehicle. The reinforcing bead 7 can have an X-shaped pattern.

FIG. 1c is a sectional view of the vehicle door of FIG. 1, taken along the section line C-C to show fastening of the door hinge 6 in a mechanical manner in a connection zone 21 via screw bolts 25 which are inserted through suitable openings in the surface portion 4. As is further apparent from FIG. 1c, a relatively deep collared edge 15 is formed with a depth T3 in the vicinity of the door hinge 6. A further collared edge 16 is formed on the opposite side of the surface portion 4 and has a depth which is noticeably smaller than the depth T3. The reinforcing bead 7, directed inwards towards the inner side 13 of the vehicle door 1, extends in midsection of the otherwise flat surface portion 4.

FIG. 1d is a horizontal sectional view of the vehicle door of FIG. 1, taken along the section line D-D through the lower third of the window frame 3. The collar 14 can also be seen and provides support for a pane (not shown) which is received in the opening 2. Opposite to the collared edge 14 is an outer collared edge 17 of a depth T4 which is smaller than the depth of the collared edge 15 in the area of the door hinge 6. The depth of the collared edge 17 can vary over the border-side course of the vehicle door 1 as required. The vehicle door 1 has no welded seams.

FIGS. 2 to 4 illustrate further exemplary embodiments of a vehicle door according to the invention. Parts corresponding with those in FIG. 1 are denoted by identical reference numerals and not explained again. The description below will center on the differences between the embodiments.

In the exemplary embodiment of FIG. 2, the vehicle door 1 has a lower surface portion 4 without a reinforcing bead. The lower surface portion 4 has zones, indicated by broken line, to indicate lower corner zones 10 which are subject to high local degrees of deformation. In these corner areas 10, the circumferential collared edge is angled further by about 90°. Due to the absence of a reinforcing bead, the lower surface portion 4 is essentially flat.

FIG. 2a is a sectional view of the vehicle door 1 of FIG. 2, taken along the section line A-A and corresponds substantially to the illustration of FIG. 1a. FIG. 2b is a sectional view of the vehicle door 1 of FIG. 2, taken along the section line B-B and shows that the lower surface portion 4 has a slight recess 18 in midsection with rounded transitions to the otherwise flat areas of the outer side 5. The recess 18 covers a greater area and is less deep, i.e. overall less contoured, than a channel-shaped reinforcing bead of U-shaped configuration, as shown in FIG. 1.

FIG. 2b further illustrates another difference compared to the embodiment of FIG. 1 and involves the provision of a reinforcing collar 19 which is welded in the area of the opening 2. The reinforcing collar 19 is arranged at a location where in the vehicle door of FIG. 1 a collared edge has been hot formed from the material of the sheet metal blank. By welding a separately manufactured reinforcing collar 19, adjustments can be made more easily in the area of the window opening 2, e.g. to take into account different panes or also bullet-resistance classes, without the need to manufacture different hot forming and press hardening tools for producing the vehicle door for this individual feature. FIG. 2d which is a sectional view of the vehicle door of FIG. 2, taken along the section line D-D also shows the reinforcing collar 19 as a completely encircling component around the opening 2 in the vehicle door 1 or window frame 3. FIG. 2c corresponds substantially to the illustration of FIG. 1c to show fastening of the door hinge 6 in a mechanical manner via screw bolts 25 inserted through suitable openings in the surface portion 4.

The exemplary embodiment of FIG. 3 differs from the embodiments of FIGS. 1 and 2 in that the vehicle door 1 has a crease along a horizontal crease line 20, so that the upper region of the vehicle door 1, i.e. the region that includes the window frame 3, is angled in relation to the surface portion 4 at an angle W1 of approx. 2-10°, as shown in FIG. 3a. As a result, the recess 9 is enlarged in midsection when compared to the exemplary embodiment in FIG. 1. The crease line 20 is closer to the opening 2 than a lower edge 22. The lower surface portion 4 has a height H1 from the lower edge 22 to the opening 2. The crease line 20 is located approximately at 80% of the height H1 measured from the lower edge 22.

The vehicle door 1 of FIG. 3 is also free of any reinforcing bead 7 in the lower door area, as shown in FIG. 1, or any further recess 18 in midsection of the lower surface portion 4, as shown in FIG. 2b. As in the exemplary embodiment in FIG. 2, a reinforcing collar 19 is arranged at the opening 2 in the window frame 3 and surrounds the opening 2 of the vehicle door 1, as shown in FIG. 3c. FIG. 3b corresponds substantially to the illustration of FIG. 1c to show fastening of the door hinge 6 in a mechanical manner via screw bolts 25 inserted through suitable openings in the surface portion 4.

The exemplary embodiment in FIG. 4 shows a vehicle door 1 without an opening, without a reinforcing bead, and without a crease line. The vehicle door 1 has a connection zone 21 in the lower surface portion 4. The connection zone 21 is slightly exposed to the outer side 5 of the vehicle door 1. This is readily apparent from FIGS. 4a and 4b. The essentially rectangular and flat connection zone 21 adjoins the angled collared edge 15 with its narrow side. Transitions 23 to the flat connection zone 21 are curved in an S-shape and are therefore designed to be flowing. Otherwise, reference is made to the description of FIG. 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A vehicle door, comprising:
   a window frame;
   a lower surface portion formed jointly with the window frame in one piece from a hot formed and press hardened sheet metal plate, at least the lower surface portion having a Brinell hardness of 500 to 600 HB and a yield strength of 1,200 to 1,450 MPa, wherein at least one of the lower surface portion and the window frame has a wall thickness of at least 6 mm;
   a curved zone defined by a radius of curvature sized to be 1 to 3 times the wall thickness; and
   a connection zone for a door hinge,
   wherein the sheet metal plate is made of a steel alloy which comprises, in weight-%:

| | |
|---|---|
| Carbon | 0.33-0.38 |
| Silicon | 0.2-0.7 |
| Manganese | 0.7-1.2 |
| Phosphorus | max. 0.03 |
| Sulfur | max. 0.02 |
| Boron | 0.002-0.005 |
| Chromium | 0.6-1.0 |
| Copper | max. 0.12 |
| Nitrogen | max. 0.005 |
| Titanium | 0.015-0.025 |
| Nickel | 1.5-2.0 |
| Molybdenum | 0.2-0.5 |
| Tin | max. 0.04, |
| and as optional components | |
| Aluminum | 0.006-0.06 |
| Niobium | 0.02-0.05 | with a balance being iron and incidental impurities.

2. The vehicle door of claim 1, wherein at least one of the window frame and the lower surface portion has a forming degree through stretching in a range of 5% to 20% and includes a recess produced during forming of the sheet metal plate and defined by a depth in a range from 10 mm to 75 mm.

3. The vehicle door of claim 1, wherein a content of carbon in the steel alloy is 0.34 to 0.37 In weight-%.

4. The vehicle door of claim 1, wherein the steel alloy has a carbon equivalent Ceq in a range from 0.7 to 0.95 in weight-%.

5. The vehicle door of claim 1, wherein the steel alloy has a carbon equivalent Ceq in a range from 0.75 to 0.90 in weight-%.

6. The vehicle door of claim 1, wherein a content of manganese in the steel alloy is 0.8 to 1.0 in weight-%.

7. The vehicle door of claim 1, wherein a content of chromium in the steel alloy is 0.7 to 0.9 in weight-%.

8. The vehicle door of claim 1, wherein a content of nickel in the steel alloy is 1.6 to 1.8 in weight-%.

9. The vehicle door of claim 1, wherein a content of molybdenum in the steel alloy is 0.3 to 0.4 in weight-%.

10. The vehicle door of claim 1, wherein a content of aluminum in the steel alloy is 0.01 to 0.05 by weight-%.

11. The vehicle door of claim 1, wherein a content of niobium in the steel alloy is 0.03 to 0.04 in weight-%.

12. The vehicle door of claim 1, wherein the wall thickness is 8 to 11 mm.

13. The vehicle door of claim 1, wherein the lower surface portion includes a reinforcing bead.

14. The vehicle door of claim 1, further comprising a crease line extending between 50% and 80% of a height of the lower surface portion, with the height of the lower surface portion measured from a lower edge of the vehicle door, when installed; wherein the vehicle door is angled along the crease line by 1° to 15°.

15. The vehicle door of claim 14, wherein the lower surface portion includes a reinforcing bead which extends on both sides of the crease line.

16. The vehicle door of claim 1, wherein the window frame is configured to surround an opening in adjoining relation to the lower surface portion.

17. The vehicle door of claim 1, wherein the curved zones form collared edges having a depth of at least 10 mm.

18. The vehicle door of claim 1, wherein the connection zone for the door hinge is formed on the lower surface portion.

19. The vehicle door of claim 1, wherein the vehicle door has an outer side to define a painted visible side.

20. The vehicle door of claim 1, further comprising a reinforcing collar welded to at least one of the window frame and the surface portion in facing relation to the opening of the window frame.

* * * * *